United States Patent
Johnson

(10) Patent No.: US 6,591,310 B1
(45) Date of Patent: Jul. 8, 2003

(54) METHOD OF RESPONDING TO I/O REQUEST AND ASSOCIATED REPLY DESCRIPTOR

(75) Inventor: Stephen B. Johnson, Colorado Springs, CO (US)

(73) Assignee: LSI Logic Corporation, Milpitas, CA (US)

(*) Notice: Subject to any disclaimer, the term of this patent is extended or adjusted under 35 U.S.C. 154(b) by 0 days.

(21) Appl. No.: 09/569,715

(22) Filed: May 11, 2000

(51) Int. Cl.[7] ............... G06F 13/14; G06F 13/20
(52) U.S. Cl. ............... 710/3; 710/5; 710/33; 710/48
(58) Field of Search ............... 710/3, 5, 33, 48

(56) References Cited

U.S. PATENT DOCUMENTS

| | | | |
|---|---|---|---|
| 4,803,622 A | * 2/1989 | Bain et al. | 710/5 |
| 5,640,599 A | * 6/1997 | Roskowski et al. | 710/106 |
| 5,812,825 A | * 9/1998 | Ueda et al. | 703/23 |
| 6,205,508 B1 | * 3/2001 | Bailey et al. | 710/260 |
| 6,356,886 B1 | * 3/2002 | Doyle | 706/46 |
| 6,430,596 B1 | * 8/2002 | Day, II | 709/202 |

OTHER PUBLICATIONS

*Intelligent I/O Architecture Specification*, Version 2.0 (Feb. 11, 1999).

* cited by examiner

Primary Examiner—Jeffrey Gaffin
Assistant Examiner—Rehana Perveen
(74) Attorney, Agent, or Firm—Macheledt Bales, LLP

(57) ABSTRACT

A reply descriptor for transmission over an I/O message passing medium in response to a corresponding request message, the descriptor comprises at least one indication field that can function as a 'flag' to identify its type, and a content field; whereby a reply message is generated only if at least one predefined condition is not met and the content field will, accordingly, comprise information of that reply message's storage location. The content field to comprise data copied from the I/O request message if each predefined condition is met. A method of responding over an I/O message passing medium to a request message comprising the steps of: generating a reply message to the request message only if at least one predefined condition is not met; generating a reply descriptor having at least one indication field and a content field; whereby the content field comprises information of the reply message's storage location if so generated. Also, a program code on a computer readable storage medium comprising: a first program sub-code for generating a reply message to a corresponding I/O request message only if at least one predefined condition is not met. The first program sub-code comprising instructions for generating a reply descriptor having at least one indication field and a content field that comprises information of the reply message's storage location if said reply message is so generated.

25 Claims, 8 Drawing Sheets

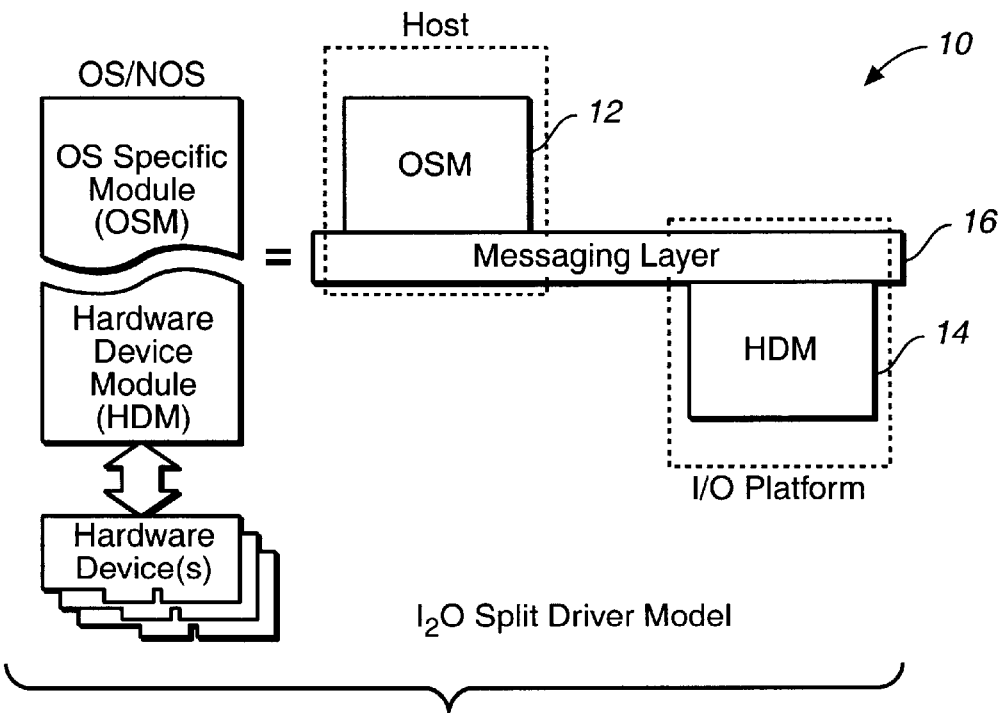
FIG._1
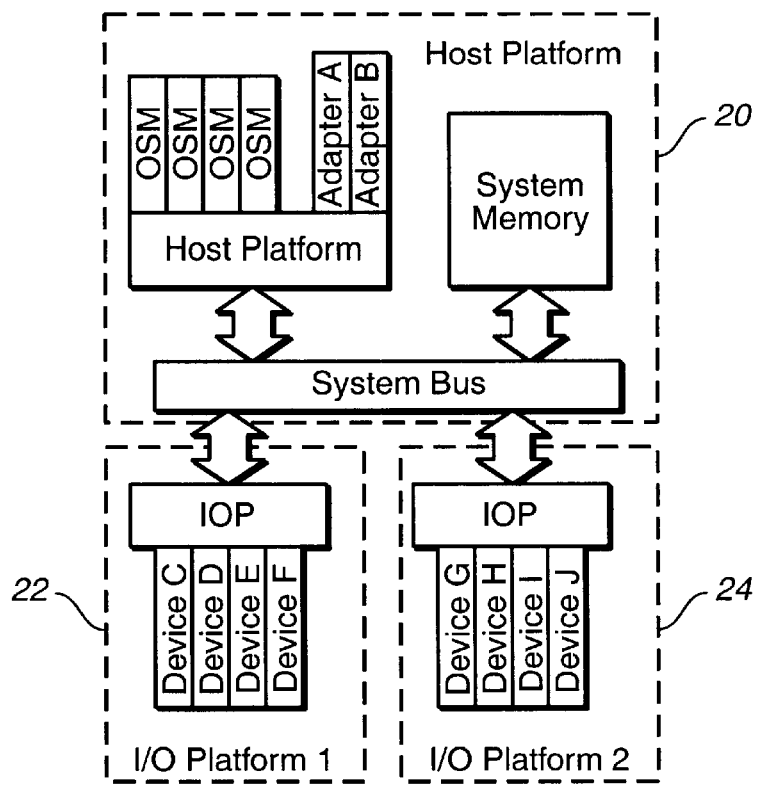
FIG._2A

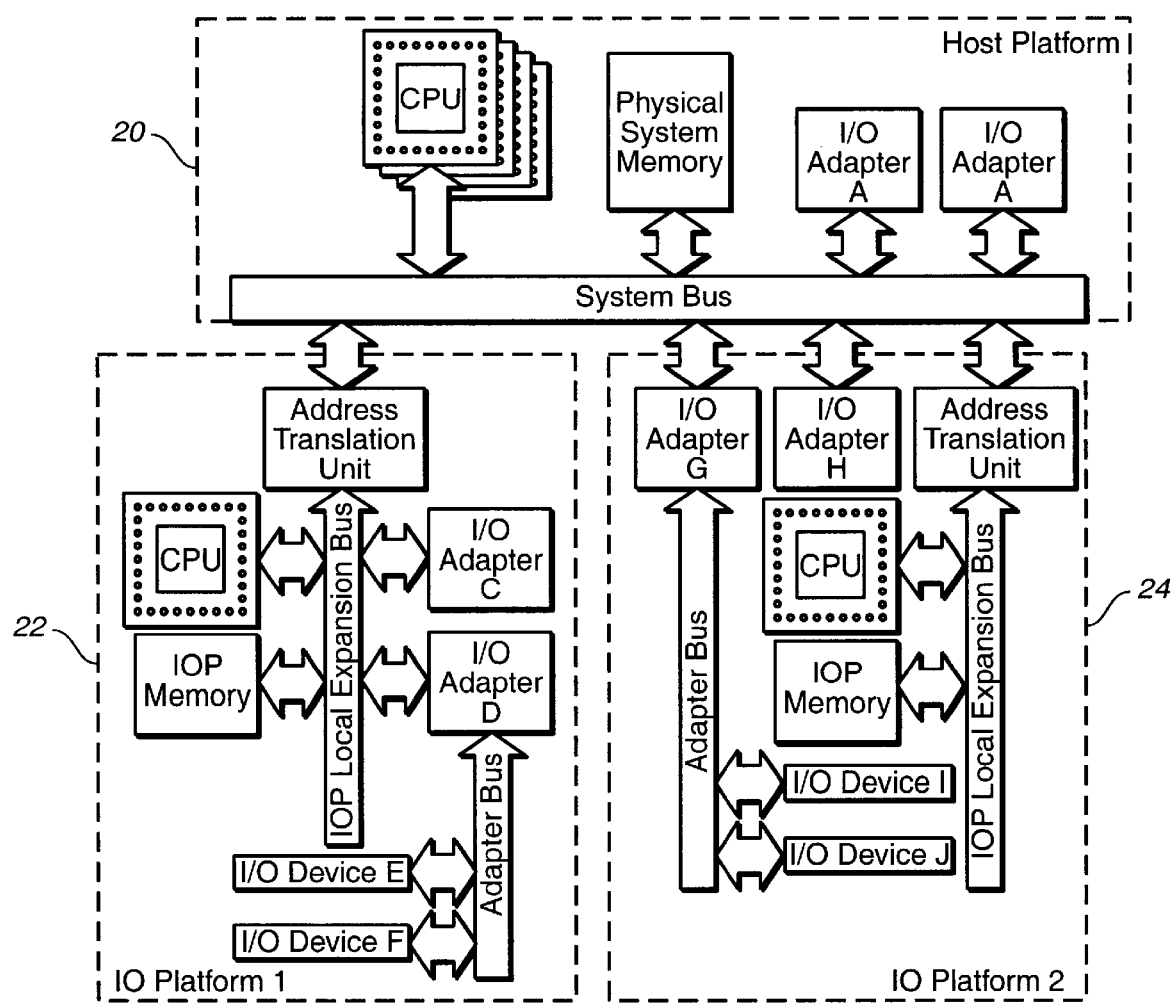
FIG._2B

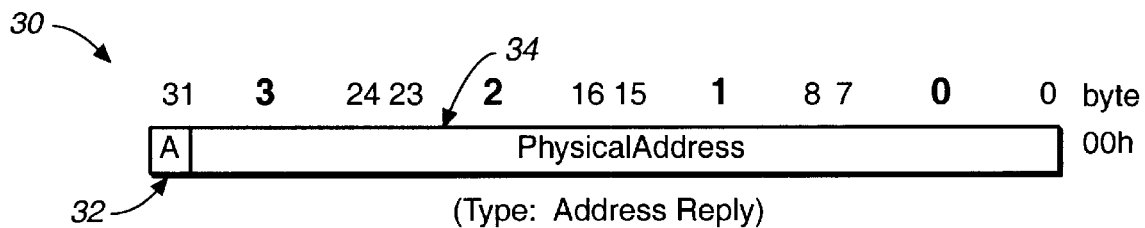
FIG._3A
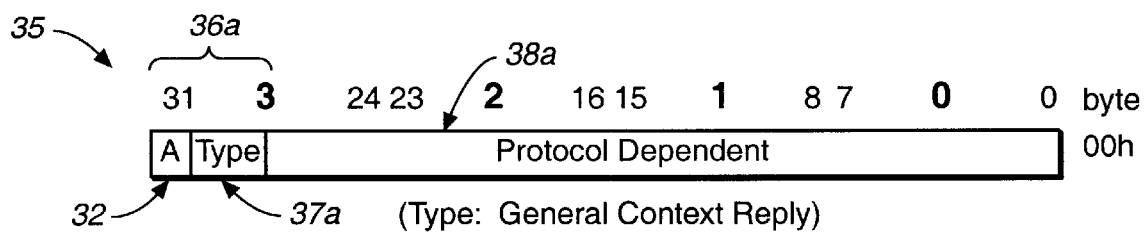
FIG._3B
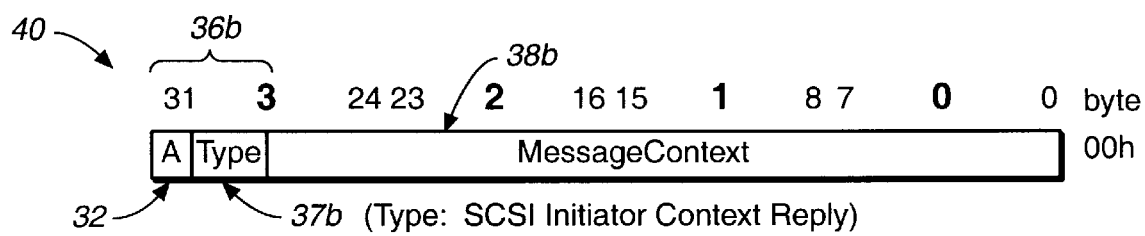
FIG._3C
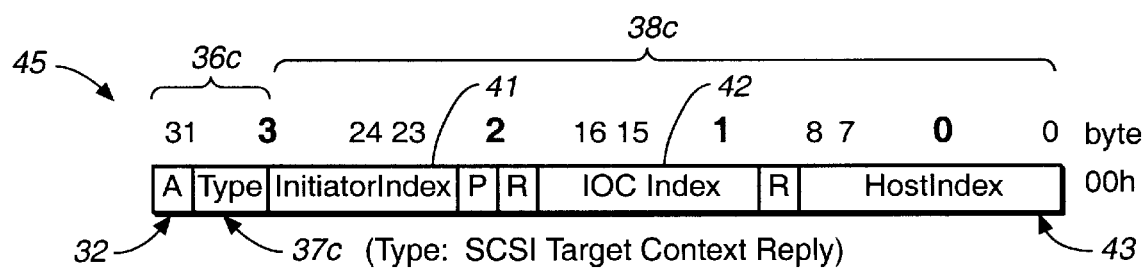
FIG._3D

50 ↘

| 31 | 3 | 24 23 | 2 | 16 15 | 1 | 8 7 | 0 | 0 | byte |
|---|---|---|---|---|---|---|---|---|---|
| Function | | Reserved | | Function Dependent | | | | | 00h |
| MessageFlags | | Function Dependent | | | | | | | 04h |
| MessageContext | | | | | | | | | 08h |

Message Header (the first 12 bytes of every message frame)

| 31 | 3 | 24 23 | 2 | 16 15 | 1 | 8 7 | 0 | 0 | byte |
|---|---|---|---|---|---|---|---|---|---|
| Function | | MessageLength | | Function Dependent | | | | | 00h |
| MessageFlags | | Function Dependent | | | | | | | 04h |
| MessageContext | | | | | | | | | 08h |
| IOCStatus | | | | Function Dependent | | | | | 0Ch |
| IOCLogInfo | | | | | | | | | 10h |

Default Reply Message (used when I/O status details are to be communicated)

FIG._3F

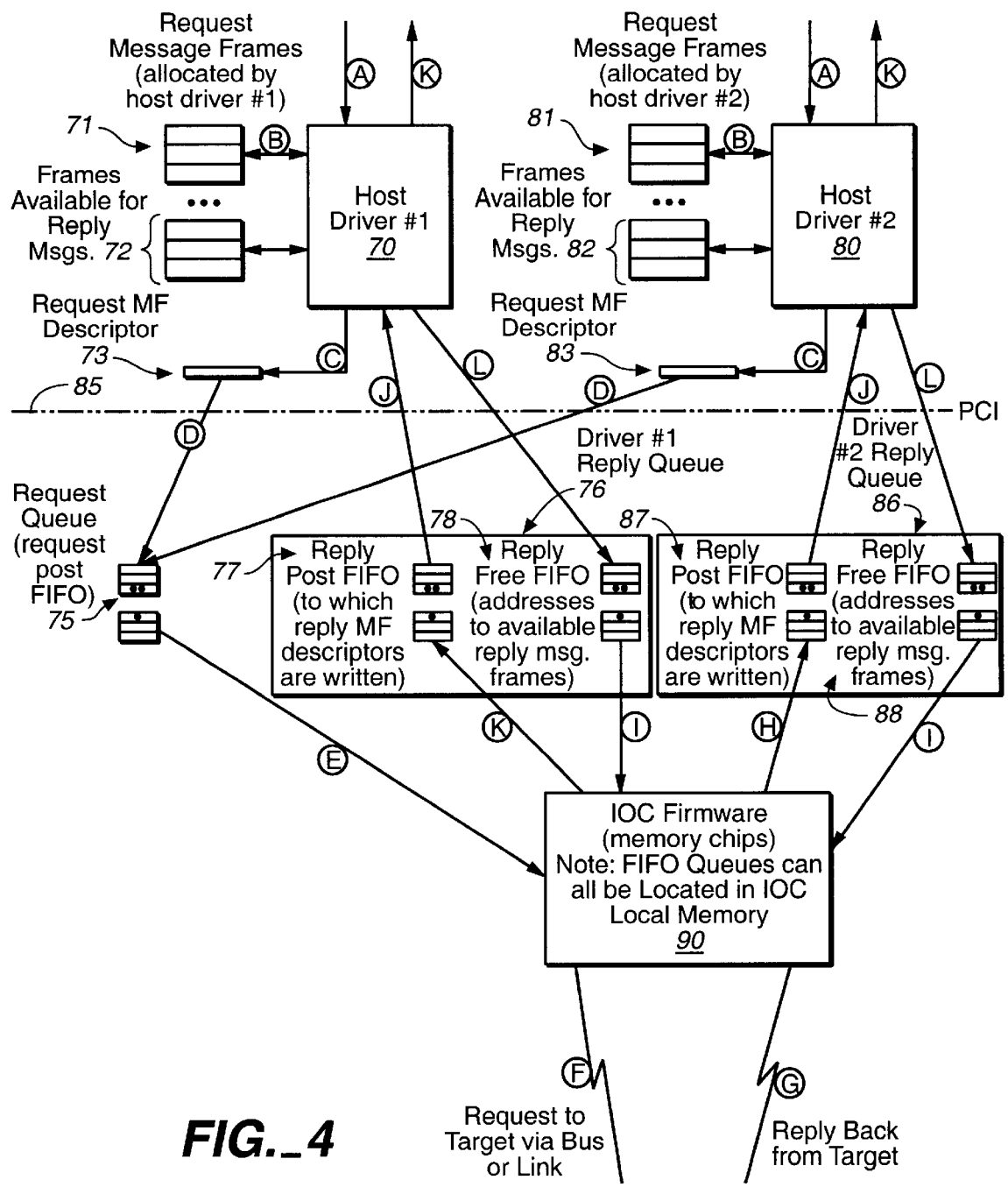
FIG._4

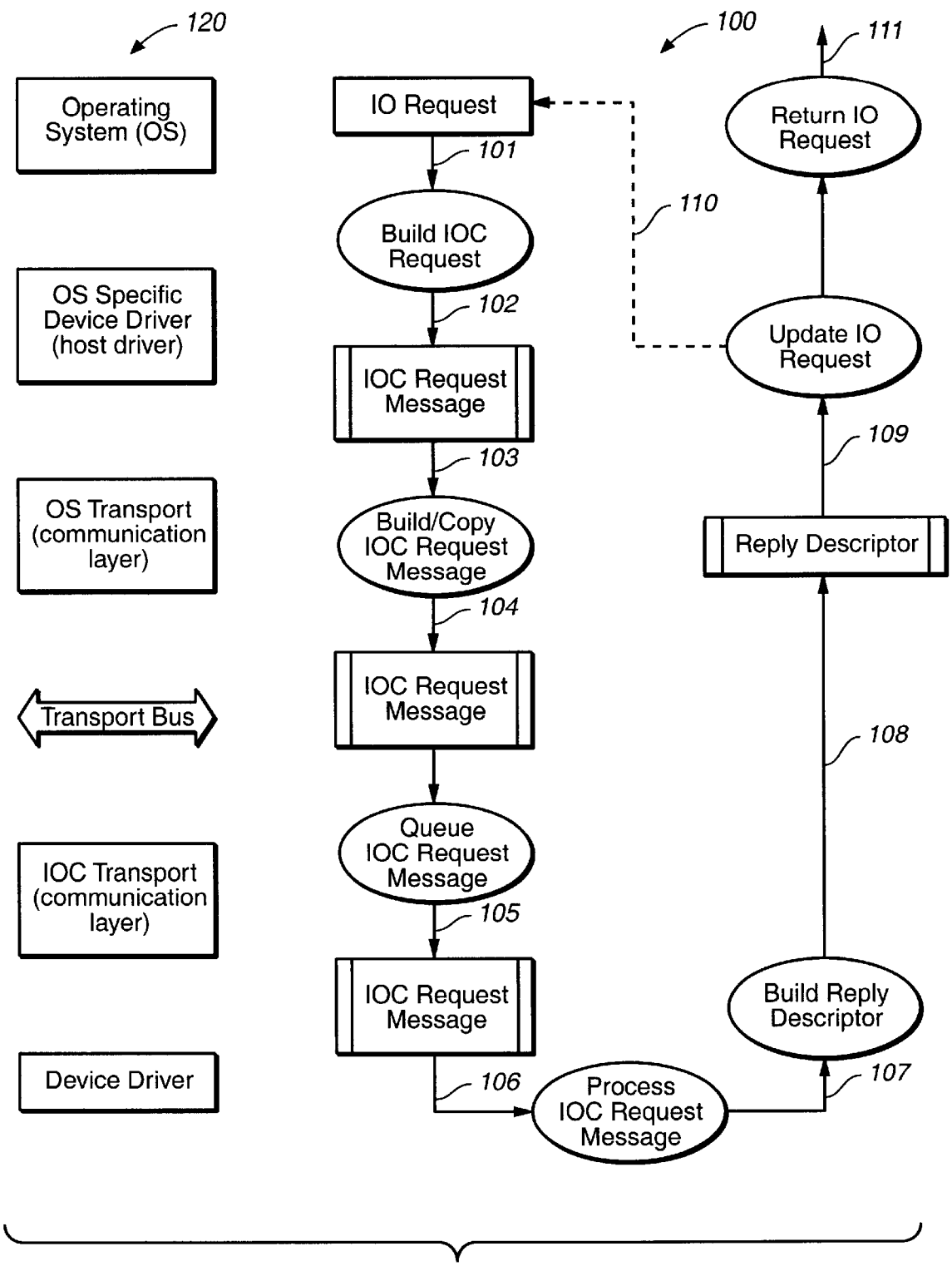
FIG._5

FIG._6

| 31 | 3 | 24 23 | 2 | 16 15 | 1 | 8 7 | 0 | 0 byte |
|---|---|---|---|---|---|---|---|---|
| Reserved | | | | | | | | 00h |
| Reserved | | | | | | | | 04h |
| Reserved | | | | | | | | 08h |
| Reserved | | | | | | | | 0Ch |
| | | | | | | | | |
| Host Interrupt Status | | | | | | | | 30h |
| Reply Interrupt Mask | | | | | | | | 34h |
| Reserved | | | | | | | | 38h |
| Request Queue | | | | | | | | 40h |
| Reply Queue | | | | | | | | 44h |
| Reserved | | | | | | | | 48h |
| | | | | | | | | 7Fh |

System Interface Register Msp

FIG._7A

| 31 | 3 | 24 23 | 2 | 16 15 | 1 | 8 7 | 0 | 0 byte |
|---|---|---|---|---|---|---|---|---|
| Function | | Reserved | | Reserved | | Action | | 00h |
| MessageFlags | | Reserved | | | | | | 04h |
| MessageContext | | | | | | | | 08h |
| Reserved | | | | | | | | 0Ch |
| Reserved | | Reserved | | Reserved | | Reserved | | 10h |
| Reserved | | | | | | | | 14h |
| Reserved | | | | | | | | 18h |

(Type: *Config* Request Message Format)

FIG._7B

| 31 | 3 | 24 23 | 2 | 16 15 | 1 | 8 7 | 0 | 0 byte |
|---|---|---|---|---|---|---|---|---|
| Function | | MessageLength | | Reserved | | Action | | 00h |
| MessageFlags | | Reserved | | | | | | 04h |
| MessageContext | | | | | | | | 08h |
| IOCStatus | | | | Reserved | | | | 0Ch |
| LogInfo | | | | | | | | 10h |
| Reserved | | Reserved | | Reserved | | Reserved | | 14h |

(Type: *Config* Reply Message Format)

160

| 31 | 3 | 24 23 | 2 | 16 15 | 1 | 8 7 | 0 | 0 | byte |
|---|---|---|---|---|---|---|---|---|---|
| Function | | Reserved | | Bus | | TargetID | | | 00h |
| MessageFlags | | Reserved | | Reserved | | CDBLength | | | 04h |
| MessageContext ||||||||| 08h |
| LUN ||||||||| 0Ch |
| ||||||||| 10h |
| Reserved ||||||||| 14h |
| CDB                                                                (msb) ||||||||| 18h |
| ••• ||||||||| 1Ch |
| ••• ||||||||| 20h |
| (lsb)                           (16 Bytes) ||||||||| 24h |
| Reserved ||||||||| 28h |
| Reserved ||||||||| 2Ch |
| SGL ||||||||| 30h |

(Type: SCSI IO Request Message Format)

| 31 | 3 | 24 23 | 2 | 16 15 | 1 | 8 7 | 0 | 0 | byte |
|---|---|---|---|---|---|---|---|---|---|
| Function | | MessageLength | | Bus | | TargetID | | | 00h |
| MessageFlags | | Reserved | | | | CDBLength | | | 04h |
| MessageContext ||||||||| 08h |
| IOCStatus | | | | Reserved | | Reserved | | | 0Ch |
| LogInfo ||||||||| 10h |
| Reserved ||||||||| 14h |
| Reserved ||||||||| 18h |
| Reserved ||||||||| 1Ch |

(Type: SCSI IO Error Reply Message Format)

FIG._8B

METHOD OF RESPONDING TO I/O REQUEST AND ASSOCIATED REPLY DESCRIPTOR

BACKGROUND OF THE INVENTION

In general, the present invention relates to communicating message information, or data, over message passing interface(s) between program modules, such as a target peripheral device module and an operating system (OS) module within an I/O system, whether the modules are executed on the same or different digital computer processors and whether utilizing different operating systems. Of particular interest is the message reply portion of the communication between I/O system modules to, eventually, send status information back to the caller (e.g., an operating system) that issued the original command, regardless of the specific communications protocol and interface technology employed. More particularly, the invention relates to a unique method of responding over an I/O message passing medium to a corresponding request message, by way of an associated novel reply descriptor transmitted in response thereto.

Within an I/O system, typical computer hardware includes a host system entity connected to communicate with one or more I/O devices. The trend in development of I/O system architecture is to utilize a split driver model, see FIG. 1, as explained more-fully in a Version 2.0 of the "Intelligent I/O Architecture Specification" dated Feb. 11, 1999 (herein referred to as simply "$I_2O$ Specification"), the written work product of the collaborative effort of several commercial entities including the applicant hereof. Within the split driver model two basic software modules are defined, each of which can execute on different physical processors and within different operating environments: (1) an OS-specific module (OSM) which provides an interface to the operating system (OS); and (2) a hardware device module (HDM) which provides an interface to each I/O adapter and corresponding device. These two basic modules intercommunicate via a logical "messaging layer" comprised of a network of MessengerInstances (depicted in FIGS. 2–3 of the $I_2O$ Specification) as illustrated herein in FIG. 1 over which request messages to I/O devices and completion reply messages are transmitted to effect commands from the operating system rather than having the host/OSM directly read and write from and to each I/O device register. The split driver model allows for expansion of the I/O system through software development, independent of both device hardware and the operating system.

I. Conventional Way to Respond to Requests per $I_2O$ Specification

Additional layers of stackable drivers beyond the basic OSM and HDM can be logically defined as has been done in the $I_2O$ Specification to provide additional functionality between the two basic program modules. The stacking of drivers increases the request and reply message load of the system, in turn decreasing its speed/performance. For example when operating within $I_2O$, on the order of 28,000 I/O messages are transmitted per second. The $I_2O$ Specification explains in Section 3.4.1 ("Message Structure and Definitions"), messages are data structures that contain a fixed-size header containing device address and payload description and, immediately following, a variable-size payload containing all additional information associated with the message. If the payload refers to memory, a scatter-gather list (SGL) is included in a format understandable by the originator, the target, the transport, and any intermediate software layers. The header and payload parts reside within a physically-contiguous buffer called the message frame buffer (such as is shown in FIGS. 3–19 of the $I_2O$ Specification).

$I_2O$ messages fall into two basic categories: (1) request messages initiate activity at the destination (a request may contain multiple transactions of the same type); and (2) reply messages return status information concerning one or more requests. According to $I_2O$ convention, a reply message is generated and sent for every request (see $I_2O$ Specification sections 6.1.2 and 6.4.4), regardless of whether the request was completed without error (see section 6.4.4.2.1 of $I_2O$).

$I_2O$ convention classifies all messages, each class has a format for request messages and a protocol for generating and transmitting reply messages for that class. For example, 'utility messages' are common to all message classes, and messages specific to a particular message class are 'base class messages'. According to the $I_2O$ Specification, inbound and outbound queues are reserved for each I/O platform (referred to therein as "IOP"—see FIGS. 2A and 2B schematically outlining the relationship between a host platform, an IOP1, and IOP2). Note that the $I_2O$ Specification uses IOP synonymously with an 'I/O processor entity' dedicated to processing I/O transactions (consisting of processor, memory, and I/O devices). The inbound queue of an IOP receives messages from all other platforms, including the host system, and the outbound queue of each IOP collectively function as an input queue for the host system. Thus, each IOP provides support for passing messages without requiring additional host system hardware. Once IOPs establish connection, the program modules at each end of the connection can send and receive messages (generally in an asynchronous fashion as non-blocking by nature). In the specific case of an SCSI Controller, for example, it is the SCSI hardware device module that detects and registers devices connected to the SCSI bus—and these devices are accessible through messages passed through the SCSI hardware device module.

According to $I_2O$ section 6.1.2, reply messages fall into two general categories (as identified by the REPLY bit in the message header's MessageFlags field): "failed" messages and "processed" messages. Failed messages are those that cannot be processed (including messages that cannot be delivered or contain invalid or missing data). A request message "fails" when the message layer cannot deliver the message or the target device does not understand the format of the request (e.g., unknown message version). Section 6.1.2.1 further distinguishes a failed message from one that is processed but is unable to be successfully completed due to "error": The inability of a device driver module (DDM) to perform or carry out the request is referred to as an "error". Thus, a successfully completed request is one that is processed without error. Note that in $I_2O$, the acronym DDM is often used generically in place of specifying whether the module is a hardware device module (HDM) or an intermediate service module (ISM).

Section 3.4.1.2.2 of $I_2O$ specifies the template for a "normal single transaction reply message" as shown in FIGS. 3–23; and section 3.4.3.2 identifies a "multiple transaction reply message" model (wherein one or more successful transactions may be combined into one reply message, see section 6.4.4.2.2 of $I_2O$).

As shown and explained in more detail in Chapter 2 of the $I_2O$ Specification (pages 2–19 through 2–22), whether request messages are sent from the host system to a hardware device module or are sent peer-to-peer (from one hardware device module to another), all reply messages built include the Initiator Address, Target Address, and the Initiator Context field from the request message. Once the reply message is built, the hardware device module calls a respective message service. The sending entity allocates a reply message frame, copies the reply message into the frame and places/writes the frame's address in the appropriate message queue. I$_2$O FIGS. 2–13 diagrams the flow of events for its conventional process of sending request and reply messages (I$_2$O Specification explanation reproduced below, for reference):

1. The operating system issues an I/O request.
2. The OSM (Operating System Module) accepts the request and translates it into a message addressed to the DDM (I$_2$O uses the acronym DDM generically for hardware device module, HDM, or intermediate service module, ISM). The Initiator Context field is set to indicate the message handler for the reply. The OSM has the option to place a pointer to the OS I/O request in the message's transaction context field.
3. The OSM invokes the communication layer to deliver the message.
4. The host's MessengerInstance (a collection of services that support initializing, configuring, and operating its client modules, see FIGS. 2–3 of the I$_2$O Specification) queues the message by copying it into a message frame buffer residing on the remote IOP.
5. The IOP on the other end posts the message to the DDM's event queue.
6. The DDM processes the request.
7. After processing the message and satisfying the request, the DDM builds a reply, copies the initiator's context and transaction context fields from the request to the reply, addresses the reply to the initiator, and finally invokes the message service to send it to the originator of the request.
8. The lOP's message service queues the reply by copying it into a message frame buffer residing at the host's MessengerInstance.
9. The IOP alerts the host's MessengerInstance to the message ready for delivery.
10. The host's MessengerInstance invokes the OSM's message handler with the reply.
11. The OSM retrieves the pointer to the OS I/O request from the message's transaction context field to establish the original request context and completes the OS I/O request.
12. The driver returns the request to the OS.

II. For Reference: Brief Background of SCSI

The widely-used small computer system interface (SCSI) protocol was developed for industry groups, under the American National Standards Institute (ANSI) and International Standards Organization (ISO) guidelines, to provide an efficient peer-to-peer I/O bus. Devices that conform with the mechanical, electrical, timing, and protocol requirements (including the physical attributes of I/O buses used to interconnect computers and peripheral devices) of the SCSI parallel interface will interoperate. This allows several different peripherals (hard disk drives, removable disk drives, tape drives, CD-ROM drives, printers, scanners, optical media drives, and so on) to be added at the same time to a host computer without requiring modifications to the generic system hardware. The working draft of the SCSI Parallel Interface-2 Standard (SPI-2), as modified (Rev. 16, dated Oct. 14, 1997), defines the cables, connectors, signals, transceivers, and protocol used to interconnect SCSI devices. The SPI-2 working draft states that a SCSI bus consists of all the conductors and connectors required to attain signal line continuity between every driver, receiver, and terminator for each signal. In operation, a SCSI bus is a bidirectional, multimaster bus which can accommodate peer to peer communications among multiple computer processing units (CPUs) and multiple peripheral devices. A SCSI device is one that contains at least one SCSI port and the means to connect the drivers and receivers to the bus.

A SCSI primary bus is one that provides for and carries 8-bit or 16-bit data transfer. A SCSI secondary bus carries an additional 16-bit data bus that, when used in conjunction with a 16-bit primary bus, provides for a 32-bit data transfer path (although the latter is not, yet, widely used). SCSI devices may connect to a bus via 8-bit, 16-bit, or 32-bit ports. To date, SCSI parallel interface devices may be implemented with 50, 68, or 80 pin connectors (whether shielded or unshielded). As is known, a typical data transfer operation over a SCSI bus between a SCSI controller (or "host adapter") located in a host computer system, to a target device (such as a disk drive) has seven SCSI "phases": (1) ARBITRATION, (2) SELECTION, (3) RESELECTION, (4) COMMAND, (5) DATA, (6) STATUS and (7) MESSAGE. For example, during the COMMAND phase, a SCSI command is transferred from the host adapter to a target (drive), and so on. Host adapter functional circuitry is typically maintained on a host bus adapter (HBA) chip on a printed circuit board structure referred to as a host adapter board (HAB) for connection to a PC host via an expansion slot.

III. For Reference: Brief Background of Fibre Channel Interconnect

Fibre Channel is a newer interface technology (emerging along with Serial Storage Architecture (SSA) and IEEE P1394) capable of transferring data as fast and faster than an Ultra3 SCSI system can, over fiber optic cabling as well as copper transmission media. Fiber Channel-type host bus adapters are installed into a host computer expansion slot just as SCSI host bus adapters are installed. Fibre channel connections are often associated with the term "loop" (from the name Fibre Channel arbitrated loop) rather than "bus" (as SCSI devices are connected). There are actually other types of Fibre Channel connections, called "point to point" and "fabric." With fibre channel, communication between hosts and devices does not have to be done directly. Instead, users can employ hubs and switches between devices on the Fibre Channel network. Hubs and switches can be used to create Fibre Channel "storage networks". Fibre Channel cabling can be copper (can be up to 30 meters in length) or fiber optic (currently up to 10 Km). In addition, no termination is necessary for fibre channel as is required in SCSI. Fiber optic ports directly placed on a peripheral device allow only for connections to fiber optic cabling. Commercially available adapters exist that allow a SCSI-compliant device to be connected to a Fiber Channel loop.

IV. Identification of New Method and Reply Descriptor

The trend in I/O architecture development is toward stacking more layers of logical drivers and creating high performance systems, thus increasing the request and reply message overhead of the I/O system, which in turn decreases system efficiency and performance. Therefore, a new useful method of responding to an I/O request message and associated reply descriptor are needed to make messaging between one or more hosts, one or more interconnected devices, or any host and an interconnected device, more efficient. Without a reasonable, reliable, and cost-effective solution at hand for increasing I/O system performance, computer hardware and software developers will find it very difficult to meet the demand for managing more devices in ever-complex I/O environments. As anyone who depends on computerized systems to accurately and efficiently perform selected tasks will readily understand: It is imperative that valuable I/O messaging data be communicated in a reliable, efficient manner that reduces system I/O overhead by using less system resources such as system memory, CPU (computer processing unit) cycles, system bus resources, and so on.

SUMMARY OF THE INVENTION

It is a primary object of this invention to provide a method of responding over an I/O message passing medium, to a request message and to provide an associated reply descriptor for transmission over an I/O message passing medium in response to a corresponding request message. A reply message need only be generated if at least one predefined condition is not met, the reply descriptor to include at least one indication field that identifies its type and a content field, whereby the content field comprises information of the reply message's storage location (in the event so generated). It is a further object to provide computer executable program code on a computer readable storage medium, having instructions for carrying out the novel method and generating the novel reply descriptor.

The simple, efficient design of the invention allows the innovative method, reply descriptor, and program code as contemplated hereby, to be tailored-to, readily installed, and run using currently-available processors, memory, communications protocol and interface types, as well as those under, or contemplated for, development. Further, unlike the conventions currently specified and in use, the unique method, reply descriptor, and program code of the invention do not require that full reply message(s) be built, copied, read and processed for each and every request message processed. In the spirit of this unique design, a reply descriptor can be generated and then transmitted for a corresponding request for any class of messages as will be further appreciated.

Although the advantages of providing the flexible new method, associated new reply descriptor, and program code, as described herein, will be more-fully appreciated in connection with the full specification, certain advantages are listed as follows:

(a) System Cost Reduction and Process Simplification—For the vast majority of request/commands generated by an initiator which are successfully completed (processed without error), a full reply message need not be build, copied, and read as is conventionally done; thus, reducing adapter CPU firmware cycles necessary to manage queues, which in turn, requires less expensive adapters to handle the reply overhead. Unlike conventional protocol, this powerful novel method and associated reply descriptor allows one to simplify the process to communicate I/O request completion. Simplifying the design reduces overall system costs, such as the cost. Reducing system costs, in-turn reduces the cost to perform important I/O messaging functions.

(b) Design Flexibility and Versatility—The invention can accommodate many different message passing medium hardware interface types; a wide variety of communications protocols and message templates; and a multitude of different types of I/O systems and devices. Furthermore, many different computer platforms can readily use the more-flexible I/O reply solutions offered by the instant invention.

Briefly described, again, the invention includes a reply descriptor for transmission over an I/O message passing medium in response to a corresponding request message. The reply descriptor comprises at least one indication field that can function as a 'flag' to identify type of the reply descriptor, and a content field; whereby a reply message is generated only if at least one predefined condition is not met and the content field will, accordingly, comprise information of that reply message's storage location. Also characterized is a method of responding over an I/O message passing medium, to a request message. The method comprises the steps of: generating a reply message to the request message only if at least one predefined condition is not met; generating a reply descriptor having at least one indication field and a content field; whereby the content field comprises information of the reply message's storage location if it is so generated.

Further characterized is a computer executable program code on a computer readable storage medium. The program code comprises: a first program sub-code for generating a reply message to a corresponding I/O request message only if at least one predefined condition is not met. The first program sub-code comprising instructions for generating a reply descriptor having at least one indication field and a content field that comprises information of the reply message's storage location if said reply message is so generated. The content field to comprise data copied from the I/O request message if each predefined condition is met.

Additional, further distinguishing associated features of the reply descriptor, method, and program code of the invention will be readily appreciated as set forth herein, including the following novel features. The message passing medium over which reply descriptors may be transmitted may comprise one or more parallel, serial, and wireless bus, or any hybrid thereof. More-specifically, suitable buses include those operational with any of a variety of hardware interface types such as SCSI (Small Computer System Interface), Fibre Channel, PCI (Peripheral Component Interconnect), PCI-X, ISA (Industry Standard Architecture), InfiniBand, IDE (Integrated Drive Electronics), USB (Universal Serial Bus), RS-232, EISA (Extended ISA), Local Bus, Micro Channel, and so on. Further, the message passing medium can utilize any number of communications protocols such as those identified as SCSI, ATM (Asynchronous Transfer Mode), IPI (Intelligent Peripheral Interface), HiPPI (HIgh Performance Parallel Interface), IP (Internet Protocol), InfiniBand, SSA (Serial Storage Architecture), IEEE P1394, and so on. Upon the writing of the reply descriptor to a reply-post buffer, an interrupt (or any suitable alert mechanism by which to signal a host that a reply descriptor has been so written) can be transmitted for a host-based driver to read the reply descriptor; and once so read, the host-based driver can correlate the reply descriptor with the request message and send a notification message on to an originating-caller (such as a host-based operating system).

If each such predefined condition is met, the indication field might further comprise a type field, and the content field can comprise data copied from and unique to the request message as generated by a host-based driver; but if the reply message is so generated, it preferably comprises data regarding the predefined condition(s) not met. The content field might further have a receiving port identifier. Also, especially in the event each such predefined condition is met, the data unique to the request message can comprise any of a number of identifiers such as: an address (whether physical or virtual) to a storage space in a memory (which could be a temporary-storage, e.g. a queue, or more-permanent storage, e.g. a message frame), an index value or offset to a table, an index value or offset to a list, an index value or offset to a register, an index value or offset to a layer of hardware registers (stack), an index value or offset to an array, content-data associated with a hardware assisted CAM, and so on. To conserve computer resources, the alert signal may be transmitted to the host-based driver after a predetermined number of such reply descriptors have been generated.

In the event the reply message is so generated, the content field of the reply descriptor can comprise an address to an available reply frame buffer located in a host memory; this address having been removed from a plurality of addresses residing on a reply-free buffer, each such address to identify a location of a corresponding reply frame buffer. Once the reply descriptor has been read by a host-based driver, the host-based driver can be instructed to remove the reply descriptor from the reply-post buffer.

BRIEF DESCRIPTION OF THE DRAWINGS

For purposes of illustrating the flexibility of design and versatility of the innovative preferred method, associated reply descriptor, and program code, the invention will be more particularly described by referencing the accompanying drawings of embodiments of the invention (in which like numerals designate like parts). The figures have been included to communicate the features of the invention by way of example, only, and are in no way intended to unduly limit the disclosure hereof.

FIG. 1 is a schematic depicting a conventional split driver model 10 as explained in the "Intelligent I/O Architecture Specification" Version 2.0 (I$_2$O Specification). An OS-specific module (identified as "OSM" at 12) that provides an interface to an operating system ("OS") and a hardware device module (identified as "HDM" at 14) that provides an interface to each I/O adapter and corresponding device, which intercommunicate via a logical "messaging layer" 16.

FIGS. 2A and 2B (reproduced from the I$_2$O Specification for easy reference) schematically outline the relationship between conventional components of an I$_2$O segment (a host platform 20, an IOP1 at 22, and IOP2 at 24).

FIG. 3A is a schematic of the fields in a preferred general address reply descriptor of the invention.

FIG. 3B is a schematic of the fields in a preferred general context reply descriptor of the invention.

FIGS. 3C and 3D are schematics of the fields in two special cases of a preferred context reply descriptor of the invention.

FIG. 3E depicts the fields of an example "header" for a message.

FIG. 3F depicts an example default reply message such as can be used to communicate certain selected details of any one or more predefined condition not met.

FIGS. 4 and 5 are schematics detailing selected message and data flow features of an I/O system designed to aid in carrying out a preferred method of the invention, including flow of a preferred reply descriptor of the invention.

FIG. 6 depicts an example map of System Interface Registers through which a host can communicate with an IOC (I/O Controller)—preferably access to these registers is provided via memory and/or IO mapping.

FIGS. 7A and 7B depict alternative message formats, specifically detailing fields of an example Config Request Message and associated Config Reply Message.

FIGS. 8A and 8B depict alternative request and reply message formats for, respectively, a SCSI I/O Request Message and a SCSI I/O Error Reply Message.

DETAILED DESCRIPTION OF THE PREFERRED EMBODIMENTS

Two basic types of preferred reply descriptors of the invention are depicted in FIGS. 3A and 3B. Turn, first, to the Address Reply Descriptor 30 shown in FIG. 3A: It includes information 34 useful for identifying a storage location of the frame for a reply message generated in connection with an unsuccessful I/O and an address bit 32.

Description of Fields Represented in the Address Reply Descriptor of FIG. 3A

| | |
|---|---|
| PhysicalAddress | Bits 1::31 of the physical address of the reply message frame generated, for example by the I/O Controller. This is a SMFA (System Message Frame Address) that has been shifted right by one bit making room for the address bit 32. |
| A | The address bit 32 is set to 1 to denote it is an Address Reply Descriptor (since at least one command/condition was not met, therefore unsuccessful I/O). |

FIG. 3B depicts another general type of reply descriptor, namely, a context reply descriptor 35 that includes data preferably comprising at least some portion or sub-portion of data copied from the corresponding request message to which descriptor 35 pertains. For reference, the field containing this data copied from the request message is labeled "Protocol Dependent" 38a. As will be better appreciated in connection with FIGS. 4 and 5, the context reply descriptor mechanism is unique, especially in that no reply message need accompany it in responding to an I/O request. The fields labeled 32 and 37a collectively make up an indication field 36a encoded for an initial 'quick' identification of whether or not the descriptor is an address reply descriptor containing a pointer, or address, to a reply message (address bit set to 1); and if the descriptor is not of an address type, the specific type of context reply descriptor it is (for example, see Type Table below).

Description of Fields Represented in the General Context Reply Descriptor of FIG. 3B

| Type Bits: | The specific type of Context reply message. Definition of Type bits (Type Table): | |
|---|---|---|
| Bit 1 | Bit 0 | Type |
| 0 | 0 | SCSI Initiator mode Context Reply |
| 0 | 1 | SCSI Target mode Context Reply |
| 1 | 0 | Reserved |
| 1 | 1 | Reserved |
| A | | The Address bit--when using a Context reply msg. this bit is reset to 0 (since there was successful completion of the I/O request). |

When the IOC is a SCSI initiator, a context reply descriptor such as that in FIG. 3C may be used for replying to an I/O request message that has been processed without error. The receipt of the reply descriptor 40 as depicted, namely a SCSI Context Reply, by the host driver implies the successful completion of the I/O. In this example, the IOC has copied (digitally, or otherwise, duplicated) the MessageContext data directly from a corresponding request message to generate a content field (38b) for the reply descriptor 40 which is put on a Reply Post buffer (such as either of the FIFO's shown in FIG. 4 at 77 and 87). The Type (37b) and A (32) sub-fields of indication field 36b, are set once the MessageContext of the request message has been copied. In this example as shown, bits 0::28 of the MessageContext can be used by the host driver in any particular way selected.

Description of Fields Represented in the SCSI Initiator Context Reply Descriptor of FIG. 3C

| | |
|---|---|
| MessageContext | A copy of the MessageContext field, bits 0::28, copied from that supplied by the host in the request message. |
| Type | The specific type of Context Reply-Set to denote a SCSI initiator mode Context Reply. |
| A | The Address bit, reset to 0 (since there was successful completion of the I/O request as in the case for general Context Reply 35). |

The alternative reply descriptor 45 illustrated in FIG. 3D has more detailed information concerning origination and transmission of the corresponding request. The specific information selected for encoding in a context reply descriptor of the invention will depend upon, among other things, I/O architecture design factors. When the IOC is in "TARGET" mode and a SCSI command has been transmitted and received, the depicted SCSI Target Context Reply Descriptor 45 may be used to convey more specific information to the host system. Here, indication field 36c is comprised of fields labeled Type (37c) and A (32) and the protocol dependent content field 38c includes valuable additional information as follows:

Description of Fields Represented in the SCSI Target Context Reply Descriptor of FIG. 3D

| | |
|---|---|
| HostIndex (43) | This index is specified by the host to track the I/O. |
| IOCIndex (42) | The index used by the IOC to track this I/O. This bit can be used to indicate on which port the initial command was received. |
| InitiatorIndex (41) | A 6-bit value indicating which initiator sent this command. For parallel SCSI systems this can be the actual initiator ID value. For FCP systems, it's an index into a table of logged in Initiators. |

-continued

| | |
|---|---|
| Type | Specifies type or mode of this Context reply message. |
| A | The Address bit, here it has been reset to 0 (since there was successful completion of the I/O request). |
| R | Reserved bit. |

As mentioned above, two types of messages are used to convey information within the I/O method and system of the invention: (1) request messages are created by the system to "request" an action by an IOC; and (2) reply messages are used by an IOC to send status information back to the system. Each message includes a message header (of any predefined size) and a payload. By way of example only, the message header 50 represented in FIG. 3E is the first 12 bytes of each message frame and reserved and unused fields will have a value of 0 (zero). The header includes information to uniquely identify the message.

Description of Fields Represented in the Message Header of FIG. 3E

| | |
|---|---|
| Function Dependent | The format of this field is dependent on the function being described. |
| Reserved | Function dependent. |
| Function | The function number of this message. This number determines the format of the rest of the message (and differentiates each request message from the others). |
| MessageFlags | All reserved bits must have a selected value, such as 0, unless otherwise identified in specific messages. |
| MessageContext | A value used to uniquely identify this message. Created by the host driver and not modified by the IOC. This value can be copied and 'returned' in the Context Reply, see FIG. 3B at 38b. |

I/O reply messages are currently used in each instance a response to an I/O request is transmitted back to an OSM (operating system module). The table below describes a default reply message such as that labeled 60 in FIG. 3F.

Description of Fields Represented in the Default Reply Message of FIG. 3F

| IOCStatus | Description |
|---|---|
| IOCSTATUS_SUCCESS | Command completed successfully from the IOC standpoint. |
| IOCSTATUS_INVALID_FUNCTION | Function not supported by the IOC. |
| IOCSTATUS_BUSY | Can not process the request at this time. |
| IOCSTATUS_INVALID_SGL | SGE not supported or understood. |
| IOCSTATUS_MSG_XFER_ERROR | System bus error detected during message transf. |
| IOCSTATUS_DATA_XFER_ERROR | System bus error detected during data transfer. |
| IOCSTATUS_INSUFFICIENT_RESOURCES | The IOC has insufficient resources to process the request at this time. |
| IOCSTATUS_INVALID_FIELD | A field in the message has an invalid value |
| IOCSTATUS_CONFIG_BAD_ACTION | The action is not supported |
| IOCSTATUS_CONFIG_BAD_TYPE | The configuration type is not supported |
| IOCSTATUS_CONFIG_BAD_PAGE | The configuration page is not supported |
| IOCSTATUS_CONFIG_BAD_DATA | Incorrect field setting within the configuration data |
| IOCSTATUS_CONFIG_NO_DEFAULTS | Can not set defaults for this page |
| IOCSTATUS_CONFIG_CANT_COMMIT | Non-volatile memory not available or error while writing persistent data to non-volatile memory |
| IOCSTATUS_SCSI_RECOVERED_ERROR | I/O operation completed successfully after retries |
| IOCSTATUS_SCSI_INVALID_BUS | Out of range Bus value in request message |
| IOCSTATUS_SCSI_INVALID_TARGETID | Out of range TargetID value in request message |
| IOCSTATUS_SCSI_DEVICE_NOT_THERE | Selection time-out or device does not exist |

-continued

| IOCStatus | Description |
| --- | --- |
| IOCSTATUS_SCSI_DATA_OVERRUN | SCSI device attempted to transfer more data than the amount specified by the byte count |
| IOCSTATUS_SCSI_DATA_UNDERRUN | SCSI device transferred less data than the amount specified by the byte count |
| IOCSTATUS_SCSI_IO_DATA_ERROR | I/O terminated because of unrecoverable bus parity or CRC error |
| IOCSTATUS_SCSI_PROTOCOL_ERROR | I/O terminated because of unrecoverable bus protocol error |
| IOCSTATUS_SCSI_TASK_TERMINATED | I/O terminated because of SCSI Task Management Request |
| IOCSTATUS_SCSI_BUS_RESET | I/O terminated because of a Bus Reset unrelated to a SCSI Task Management Request |
| IOCSTATUS_SCSI_TASK_MGMT_FAILED | SCSI Task Management function failed |
| IOCSTATUS_TARGET_PRIORITY_IO | An I/O operation has been received that requires priority handling |
| IOCSTATUS_TARGET_INVALID_PORT | A command was directed to a port that does not exist on this IOC. |
| IOCSTATUS_TARGET_INVALID_IOCINDEX | The Target Host used an IocIndex value that is invalid or not in use on the IOC. |
| IOCSTATUS_TARGET_ABORTED | This is a reply for an I/O or buffer that was aborted at the request of the host. |
| IOCSTATUS_TARGET_NO_CONNECTION_RETRYABLE | Unable to communicate to the Initiator of this I/O. The host can retry this operation later. |
| IOCSTATUS_TARGET_NO_CONNECTION | Unable to communicate to the Initiator of this I/O. This I/O can never be continued. |
| IOCSTATUS_TARGET_FC_ABORTED | This is a reply for an operation or buffer that was aborted at the request of the host. |
| IOCSTATUS_TARGET_INVALID_DID | The Target Host attempted to send a request that indicated a D_ID value that is not in use. |
| IOCSTATUS_TARGET_FC_NODE_LOGGED_OUT | This operation has been canceled because the destination node has logged us out. |
| IOCLogInfo Should be logged by the host driver. | |

One can readily appreciate the many and various types kinds of events which could trigger the building of a reply message according to the method and program code of the invention. An address reply descriptor such as that depicted at 30 in FIG. 3A, is accordingly generated in order to locate the reply message to which it points. It is only when at least one condition is not met, indicating that the request was not processed without error, that such a reply message is generated for transmission over the I/O message passing medium. For example, occurrence of one or more of the following events, among others, could trigger the generation of a reply message: execution of any one command of the request is not completed initially or after a selected number of 'retrys', any one command of the request was made at an improper time, an allotted time for execution of any one command of the request was exceeded, unsuccessful data transfer of any portion of the request message, quantity of data transferred exceeded byte count specifications, quantity of data transferred was less-than that required in byte count specifications, processor resources were insufficient to execute any one command of the request, at least one field of the request message included invalid data, at least one value from the request message was out of range, data transferred was insufficient to execute any command of the request, hardware interface of the message passing medium was incompatible with the target device, communications protocol utilized by the message passing medium was incompatible with the target device, an unrecoverable bus parity error has occurred, a task management function has failed, a host processor aborted the request message, a target device node has logged-off, and so on.

The following is provided by way of reference: A message is any sized set or subset of data generated for transmission over a communications/message passing medium (which can comprise cabling, alone, or can include transmission through space from a transmitter to a receiver, or some combination thereof) whether local or physically remote. For each data element, there can be many fields in the database that hold the data items. As basic units of storage, a data element describes the logical unit of data (i.e., the logical definition of the field), fields are the physical storage units (typically one or more bytes in size), and data items are the individual instances of the data elements (i.e., actual data stored in the field). Computer readable storage medium/media, as used herein, can be any data carrier or recording medium into, or onto, which information (such as data) can be read and copied, such as magnetic (diskettes, hard disks, Iomega Corporation's ZIP™/JAZ™/Click!™ disks, tapes, drums, core, thin-film, etc.), optic (CD-ROM, CD-E, CD-R, CD-RW, DVD, and other devices whereby readout is with a light-source and photodetector), magneto-optic media (media for which optical properties can be changed by an applied magnetic field—used in high end drives), and other such devices.

A stack is a set of hardware registers or a reserved amount of memory used for arithmetic calculations, keep track of internal operations, etc. A CAM (Content Addressable Memory), also referred to as "associative storage", is storage that can be accessed by comparing the content of the data stored in it rather than by addressing predetermined locations. A buffer is any reserved segment of memory or accessible storage used to hold data during processing. A host can be any computer or computerized device that acts as a source of information or signals, including for example, a centralized mainframe that is a 'host' to its terminals, a server that is 'host' to its clients, to a desktop PC that is 'host' to its peripherals, and in network architectures, a client station that is a source of information to the network.

As mentioned above, the message passing medium over which reply descriptors may be transmitted may comprise one or more parallel, serial, and wireless buses, or any hybrid thereof. More-specifically, suitable buses include those operational with a variety of hardware interface types such as those identified as SCSI; Fibre Channel; PCI (Peripheral Component Interconnect—commonly used to provide a high-speed data path between the CPU and peripheral devices such as video, disk, network, etc.); PCI-X; ISA (Industry Standard Architecture—an expansion bus commonly used in PCs along with ISA buses); InfiniBand; IDE (Integrated Drive Electronics—widely used to connect hard disks, CD-ROMs and tape drives to a PC); RS-232 (Recommended Standard-232—an TIA/EIA standard for serial transmission between computers and peripheral devices such as modem, mouse, etc., that uses a 25-pin DB-25 or 9-pin DB-9 connector); USB (Universal Serial Bus—used for low-speed peripherals such as the keyboard, mouse, joystick, scanner, printer and telephony devices); EISA (Extended ISA); Local Bus; Micro Channel; and so on.

The message passing medium can utilize any of a wide variety of suitable communications protocol such as SCSI; ATM (Asynchronous Transfer Mode—a network technology for both LANs, local area networks, and WANs, wide area networks); IPI (Intelligent Peripheral Interface-a high-speed hard disk interface used with minicomputers and mainframes that transfers data in the 10 to 25 MBytes/sec range); HiPPI (HIgh Performance Parallel Interface—an ANSI-standard high-speed communications channel that uses a 32-bit or 64-bit cable and transmits at 100 or 200 Mbytes/sec); IP (Internet Protocol-the IP part of the TCP/IP communications protocol); InfiniBand, SSA (Serial Storage Architecture); IEEE P1394 (sometimes referred to as "FireWire"—high-speed serial bus communications that allows for the connection of up to 63 devices); and so on.

One can better appreciate the flexibility of the reply descriptor and message flow of the invention in connection with viewing FIG. 4 which, by way of example only, includes the novel intercommunication of two separate host drivers represented and labeled as #1 at 70 and #2 at 80. The transmission of information in the form of request and reply descriptors as well as request and reply messages throughout the I/O system represented can be accomplished through the use of, for example, a dual function in PCI (the logical separation of which is indicated by dashed line 85) and multiple service connections in InfiniBand. Steps detailing activity within a novel I/O system that can carry out a preferred method of the invention are summarized below in connection with corresponding data flow lines (labeled A through L in FIG. 4):

A. Each host driver 70, 80 initially receives an I/O request from an operating system (not shown, for simplicity).

B. Each host driver allocates a system message frame (SMF) from a collection of frames such as those shown at 71 and 81 which preferably resides in system/host memory, and builds an I/O request message within the SMF. Since, here, SMFs reside in host memory, the particular means by which allocation is carried out is the responsibility of the host driver, and can be one of any conventional SMF allocation method.

C. Each host driver 70, 80 generates its own request message frame descriptor (represented at 73, 83) for each respective I/O request message built by the host.

D. Each host driver writes its respective request message frame descriptor 73, 83 to a request queue labeled Request Post FIFO at 75 (in this novel example, the Request Post FIFO 75 manages request message frame descriptors from both host drivers 70, 80). At this point the IOC (represented at 90) takes ownership/control of the SMF within which each respective I/O request message resides.

E. The IOC 90 reads the request message frame descriptors from the Request Post FIFO 75 and DMA's (Direct Memory Access—whereby data is transferred from memory to memory without using the CPU) the request messages to a local message frame (here, 'local' to the IOC).

F. The IOC 90 generates and sends the appropriate request messages to a target device based on the port type associated with the Bus and TargetID fields of the request message. For an example of an I$_2$O request message structure which can be accommodated according to the invention—see I$_2$O Specification, section 3.4.1.2.1.

G. The IOC 90 receives the reply information from the target device—concerning whether the original request was processed without error, and if not, an indication of which condition was not met (the latter generally only to occur in a small fraction of the cases, such as for example, if a driver or interconnection is faulty).

H. If the I/O status is successful (request was processed without error) the IOC 90 writes data unique to the corresponding original request message, such as the MessageContext field value (see FIG. 3C at 38*b*) or other Protocol Dependent data (see FIG. 3B at 38*a* and FIG. 3D at 38*c*) to the respective reply queue (labeled 77, 87 Reply Post FIFO), in turn, causing an alert signal to be transmitted (e.g., a system interrupt is generated) letting the respective host driver 70, 80 know that a reply descriptor is in the Reply Post buffer 77, 87. At this point, the respective system/host driver (represented at 70, 80) regains ownership/control of the SMF within which each respective I/O request message resides.

I. If the I/O status is not successful (e.g., either the I/O request was not fully processed or it was processed but done so with an error, thus, the I/O request was not successfully completed), the IOC 90 removes an address to an available reply message frame from the reply queue (labeled 78, 88 Reply Free FIFO). The IOC 90 then generates a reply message in the host based message frame and writes the physical address of the reply message frame, shifted to the appropriate bits, to the respective reply queue (labeled 77, 87 Reply Post FIFO), in turn, causing a signal to be transmitted (e.g., a system interrupt is generated) informing the respective host driver 70, 80 that a reply descriptor is in the Reply Post buffer 77, 87. At this point, the respective system/host driver (represented at 70, 80) regains ownership/control of the SMF within which each respective I/O request message resides.

J. The system/host driver 70, 80 receives the respective interrupt (or other suitable signal) and reads the Reply Post FIFO buffer 77, 87 to get the content field (comprising data such as the MessageContext field value, see FIG. 3C at 38*b,* some other Protocol Dependent data, see FIG. 3B at 38*a* and FIG. 3D at 38*c,* or a PhysicalAddress, see FIG. 3A at 34, to the host-based reply message frame generated under step I. above). If there are no posted reply descriptors when the system/host driver 70, 80 reads a respective Reply Post FIFO 77, 87, the host driver 70, 80 will receive some arbitrary value (such as the value FFFFFFFFh) indicating that there are no more reply descriptors to be read.

K. Each respective host driver 70, 80 then responds to the initiator/caller (such as an operating system, not shown for simplicity) appropriately.

L. In the event a reply frame (72, 82) was needed during the process to respond to the initial I/O request (which generally occurs only in a very small fraction of the cases) and, thus, an available address was removed from the Reply Free buffer (78, 88) and a reply message generated and written to the allocated reply frame, the host driver (70, 80) returns the address to the respective Reply Free FIFO buffer 78, 88.

Referring back once more to FIGS. 3A and 3B to summarize the features depicted by FIG. 4: The Address Reply mechanism (such as that explained above as step I. where the I/O status is not successful) requires an IOC 90 to remove an available SMF address from the Reply Free buffer (FIG. 4 at 78 or 88), build a reply message, DMA the reply message to the respective host driver 70, 80, as well as build a reply descriptor (FIG. 3A at 30) and place it on a respective Reply Post buffer (FIG. 4 at 77, 87). On the other hand, the much more efficient context reply mechanism of the invention (explained above as step H. where the I/O status is successful) reduces these PCI accesses, thus increasing performance, to a single write of a reply descriptor (such as any of those depicted in FIGS. 3B, 3C, and 3D at 35, 40, and 45) to the Reply Post buffer (FIG. 4 at 77, 87). This is accomplished by having the IOC write a single content field (of any designated length) shifted the appropriate bits to accommodate an indication field (that can function to identify the general type of reply descriptor, see FIGS. 3B, 3C, and 3D at 36a, 36b, and 36c) to a Reply Post buffer (FIG. 4 at 77, 87). See also, the data flow diagram labeled FIG. 5.

Therefore, as one can readily appreciate that the novel context reply mechanism of the invention requires that a host driver do only a single PCI Read to retrieve the context and indication fields (such as are referenced at 38a–38c and 36a–36c of reply descriptors 35, 40, 45, respectively) from a Reply Post buffer, and no PCI Write to post the Reply Free SMF address is needed in the majority of instances where no reply message frame is used when the I/O status is successful. Note that the figures label several queues specifically as FIFO (first-in-first-out), although they need not be that particular type of buffer.

Turning to the data flow diagram labeled FIG. 5, identified (for reference only) along the left hand side (see arrow 120) are blocks representing the various logically defined layers of an I/O system execution environment. Details of the I/O system data flow represented in FIG. 5 are set forth below in connection with reference numbers:

101. An initiator/caller Operating System (OS) issues a request or command.
102. An OSM (operating system module, or OS Specific Device Driver)—such as the two modules referenced in FIG. 4 as host drivers 70, 80—accepts the request and translates it into a request message addressed to a target DDM. The OSM has the option to place a pointer (location indicator, such as a physical or virtual address) to the OS I/O request in the request message's TransactionContext field.
103. The OSM (system/host driver e.g., the host drivers at 70, 80 in FIG. 4) invokes the communication layer to deliver the request message.
104. The host driver queues the request message (can be done via mechanism such as that identified in I$_2$O Specification as MessengerInstance) by copying it into a message frame buffer residing on an IOC.
105. The IOC posts the request message to the target DDM's event queue.
106. The target DDM processes (or, at least attempts to process) the request.
107. After the target DDM processes and satisfies the request successfully (which occurs for the vast majority of request messages transmitted), the IOC generates a reply descriptor for that request. Note here that, although not specifically illustrated in FIG. 5, for the small percentage of request messages that are not 'processed without error' an available reply message frame address is removed from available message frame addresses residing in a buffer (e.g., Reply Free buffer at 78 or 88 in FIG. 4), a reply message is built by the IOC to include information concerning the fault, error, failure, etc., (i.e., that which has not been met) and copied into the reply message frame. The IOC then generates a reply descriptor (with an address, or whereabouts, of the reply message frame, with bits shifted to accommodate an indication field).
108. The reply descriptor generated (whether it be an Address Reply or the more often encountered Context Reply, see FIGS. 3A–3D) is queued to a Reply Post buffer (such as those shown in FIG. 4 at 77, 87).
109. The writing of the reply descriptor to a Reply Post buffer can be done in connection with some type of an alert signal, e.g., a system interrupt, to the system/host driver that a reply descriptor is ready for reading. The system driver receives the alert signal and reads the Reply Post buffer to get the reply descriptor information. Due to indication field 32 of the reply descriptor (see examples in FIGS. 3A–3D), it is readily apparent whether the descriptor is of an Address or Context reply type. If the descriptor is of the Address type, the associated reply message must be found and read.
110. The system/host driver then correlates each specific reply response with an original, corresponding request to complete the response process. For example, the host driver can retrieve an address-pointer to the original I/O request by looking at a Context reply descriptor's context field (see 38a, 38b, 38c in FIGS. 3B–3D) or looking at an I/O request identifier found in any reply message, if it was necessary to so generate a reply message (see FIG. 8B for an example format).
111. The host driver returns the I/O request to the initiator operating system.

Since a host system generally communicates with an IOC through the use of System Interface registers, by way of example only, FIG. 6 illustrates an example System Interface Register Map 130 for this purpose. Access to registers can be provided as is customary in I/O architecture, via memory and/or I/O mapping.

FIG. 7A illustrates yet another example of a request message format, namely a Config request message 140, for supporting configuration operations such as read/write. The format of an example reply message to the FIG. 7A request, is represented at 150 in FIG. 7B. The Config request message 140, such as that in FIG. 7A, is used to access operational parameters supported by the IOC.

Description of Fields Represented in the Example Config Reply Message of FIG. 7B

| IOCStatus | This field is used to return IOC supplied information specific to Configuration requests in addition to the function independent values specified as shown in the Default Reply Message. |
|---|---|

| IOCStatus | Description |
|---|---|
| IOCSTATUS_CONFIG_BAD_ACTION | The action is not supported |
| IOCSTATUS_CONFIG_BAD_TYPE | The configuration type is not supported |
| IOCSTATUS_CONFIG_BAD_PAGE | The configuration page is not supported |
| IOCSTATUS_CONFIG_BAD_DATA | Incorrect field setting within the configuration data |
| IOCSTATUS_CONFIG_NO_DEFAULTS | Can not set defaults for this page |
| IOCSTATUS_CONFIG_CANT_COMMIT | Non-volatile memory not available or error while writing persistent data to non-volatile memory |
| Reserved | Function specific fields. |

FIGS. 8A and 8B depict an alternative SCSI request message format labeled 160 and corresponding error reply message format 170: SCSI Initiator IO message represented in FIG. 8A is used to send a specific class of requests, namely, SCSI I/O requests to specific target devices. And according to the novel features of the invention, the SCSI IO Error reply message 170 in FIG. 8B need only be generated and transmitted if the SCSI IO request experiences any of a number of errors or failures during the process to carry it out (e.g., an event occurs such that any one of a set of predefined conditions is not met) and the IO request is, therefore, not completed.

Description of Fields Represented in the Example SCSI IO Request Message of FIG. 8A

| TargetID | The target device identification number. |
|---|---|
| Bus | The SCSI bus number that the target device exists on. |
| CDBLength | Number of used bytes in CDB field. |
| MessageFlags | All reserved bits must have a value of 0. |
| LUN | The Logical Unit Number of the target device. |
| CDB | SCSI Command Descriptor Block. |

-continued

| SGL | The scatter gather list which identifies the memory location of the data for this IO. |
|---|---|

Description of Additional Fields Represented in the FIG. 8B Example Error Reply Message

| IOCLogInfo | An implementation specific value intended to supplement the IO Controller status. |
|---|---|
| IOCStatus | This field is used to return IOC supplied information specific to SCSI IO requests in addition to the function independent values specified in FIG. 3F Default Reply Message. |

| IOCStatus examples | Description |
|---|---|
| IOCSTATUS_SCSI_RECOVERED_ERROR | I/O operation completed successfully after retries |
| IOCSTATUS_SCSI_INVALID_BUS | Out of range Bus value in request message |
| IOCSTATUS_SCSI_INVALID_TARGETID | Out of range TargetID value in request message |
| IOCSTATUS_SCSI_DEVICE_NOT_THERE | Selection time-out or device does not exist |
| IOCSTATUS_SCSI_DATA_OVERRUN | SCSI device attempted to transfer more data than the amount specified by the byte count |
| IOCSTATUS_SCSI_DATA_UNDERRUN | SCSI device transferred less data than the amount specified by the byte count |
| IOCSTATUS_SCSI_IO_DATA_ERROR | I/O terminated because of unrecoverable bus parity CRC error |
| IOCSTATUS_SCSI_PROTOCOL_ERROR | I/O terminated because of unrecoverable bus protocol error |
| IOCSTATUS_SCSI_TASK_TERMINATED | I/O terminated because of SCSI Task Management Request |
| IOCSTATUS_SCSI_BUS_RESET | I/O terminated because of a Bus Reset unrelated to a SCSI Task Management Request |
| IOCSTATUS_SCSI_TASK_MGMT_FAILED | SCSI Task Management function failed |
| Reserved | Function dependent fields. |

While certain representative embodiments and details have been shown merely for the purpose of illustrating the invention, those skilled in the art will readily appreciate that various modifications may be made without departing from the novel teachings or scope of this invention. Accordingly, all such modifications are intended to be included within the scope of this invention as defined in the following claims. Although the commonly employed preamble phrase "comprising the steps of" may be used herein, or hereafter, in a method claim, the Applicants in no way intends to invoke 35 U.S.C. section 112 ¶6. Furthermore, in any claim that is filed hereafter, any means-plus-function clauses used, or later found to be present, are intended to cover the structures described herein as performing the recited function and not only structural equivalents but also equivalent structures.

What is claimed is:

1. A reply descriptor for transmission over an I/O message passing medium in response to a corresponding request message, comprising:

at least one indication field that identifies type of the reply descriptor, and a content field; and whereby a reply message is generated only if at least one predefined condition is not met and said content field comprises information of said reply message's storage location, if so generated.

2. The reply descriptor of claim 1 wherein:

the message passing medium comprises a bus operational with a hardware interface type selected from the group consisting of SCSI (Small Computer System Interface), Fibre Channel, PCI (Peripheral Component Interconnect), PCI-X, ISA (Industry Standard Architecture), InfiniBand, IDE (Integrated Drive Electronics), USB (Universal Serial Bus), RS-232, EISA (Extended ISA), Local Bus, and Micro Channel; and the message passing medium utilizes a communications protocol selected from the group consisting of SCSI, ATM (Asynchronous Transfer Mode), IPI (Intelligent Peripheral Interface), HiPPI (HIgh Performance Parallel Interface), IP (Internet Protocol), InfiniBand, SSA (Serial Storage Architecture), and IEEE P1394.

3. The reply descriptor of claim 1 wherein: upon the writing of the reply descriptor to a reply-post buffer, an interrupt is transmitted for a host-based driver to read the reply descriptor; and once so read, said host-based driver correlates the reply descriptor with the request message and sends a notification message to an originating-caller.

4. The reply descriptor of claim 1 wherein:

said indication field comprises an address bit;

if each said predefined condition is met, said indication field further comprises a type field, and said content field comprises data copied from and unique to the request message as generated by a host-based driver; but if said reply message is so generated, said reply message comprises data regarding said at least one predefined condition not met.

5. The reply descriptor of claim 4 wherein:

if each said predefined condition is met, said content field further comprises a receiving port identifier; and said data unique to the request message comprises an identifier selected from the group consisting of: an address to a storage space in a memory, an index value to a table, an index value to a list, an index value to a register, an index value to a stack, an index value to an array, and content-data associated with a hardware assisted CAM; and said reply-post buffer is a FIFO (First-In-First-Out) type buffer.

6. A reply descriptor for transmission over an I/O message passing medium in response to a corresponding request message, comprising:

at least one indication field comprising an address bit, and a content field;

whereby a reply message is generated only if at least one predefined condition is not met and said content field comprises information of said reply message's storage location, if so generated;

wherein each said predefined condition is met: said indication field further comprises a type field, said content field comprises data copied from and unique to the request message as generated by a host-based driver, said data unique to the request message comprises a host-specified index value;

an alert signal for said host-based driver is transmitted upon the writing of both the reply descriptor and a second reply descriptor to a reply-post buffer, said second reply descriptor comprising a second content field having second data copied from a second request message, and once said reply descriptors have been read by said host-based driver, said host-based driver correlates each said reply descriptor with a respective request message and notifies an originating-caller of completion of both of said request messages.

7. The reply descriptor of claim 1 wherein: said at least one predefined condition is not met and said content field comprises said information, said information to comprise an address to an available reply frame buffer located in a host memory; and said address is one from a plurality of addresses, each of which identifies a location of a corresponding reply frame buffer.

8. The reply descriptor of claim 7 wherein said at least one predefined condition is not met because execution of at least one command included in the request message was not completed, said corresponding reply frame buffers reside in said host memory, and said plurality of addresses resides on a reply-free FIFO buffer.

9. The reply descriptor of claim 8 wherein:

once said address to said available reply frame buffer is removed from said reply-free FIFO buffer, said reply message is generated by an I/O controller (IOC) and copied into said available reply frame buffer; and the reply descriptor is written to a reply-post buffer for a host-based driver to read.

10. The reply descriptor of claim 1 wherein:

the request message comprises at least one command; and said at least one predefined condition is not met upon the occurrence of an event selected from the group consisting of: execution of said command is not completed, execution of said command is not completed after a retry, said command is made at an improper time, an allotted time for execution of said command is exceeded, unsuccessful data transfer of any portion of the request message, quantity of data transferred exceeds byte count specifications, quantity of data transferred is less-than byte count specifications, processor resources are insufficient to execute said command, at least one field of the request message comprises invalid data, at least one value from the request message is out of range, any data transferred is insufficient to execute said command, hardware interface of the message passing medium is incompatible with a target device, communications protocol utilized by the message passing medium is incompatible with a target device, an unrecoverable bus parity error has occurred, a task management function has failed, a host processor aborts the request message, and a target device node has logged-off.

11. A method of responding over an I/O message passing medium, to a request message, the method comprising the steps of:

generating a reply message to the request message only if at least one predefined condition is not met;

generating a reply descriptor having at least one indication field that identifies type of said reply descriptor, and a content field; whereby said content comprises information of said reply message's storage location if said reply message is so generated.

12. The method of claim 11 wherein: if each said predefined condition is met, said content field to comprise data copied from the request message rather than said storage location information.

13. The method of claim 12 wherein:

the message passing medium comprises a bus operational with a hardware interface type selected from the group consisting of SCSI (Small Computer System Interface), Fibre Channel, PCI (Peripheral Component Interconnect), PCI-X, ISA (Industry Standard Architecture), InfiniBand, IDE (Integrated Drive Electronics), USB (Universal Serial Bus), RS-232, EISA (Extended ISA), Local Bus, and Micro Channel; and the message passing medium utilizes a communications protocol selected from the group consisting of SCSI, ATM (Asynchronous Transfer Mode), IPI (Intelligent Peripheral Interface), HiPPI (HIgh Performance Parallel Interface), IP (Internet Protocol), InfiniBand, SSA (Serial Storage Architecture), and IEEE P1394.

14. The method of claim 12 wherein said indication field comprises an address bit, and further comprising the steps of:

if each said predefined condition is met, generating said indication field to further comprise a type field and generating said data copied to comprise data unique to the request message; but said at least one predefined condition is not met, generating said reply message to comprise data regarding said at least one predefined condition not met.

15. The method of claim 14 further comprising the steps of:

upon the writing of said reply descriptor to a reply-post buffer, transmitting an alert signal for said host-based driver to read said reply descriptor; and once so read, correlating said reply descriptor with the request message and notifying an originating-caller of a completion results.

16. The method of claim 12 further comprising the steps of initially receiving an I/O request comprising at least one command from an operating system, and generating the request message to include said one command; and wherein said at least one predefined condition is not met upon occurrence of an event selected from the group consisting of: execution of said command is not completed, execution of said command is not completed after a retry, said command is made at an improper time, an allotted time for execution of said command is exceeded, unsuccessful data transfer of any portion of the request message, quantity of data transferred exceeds byte count specifications, quantity of data transferred is less-than byte count specifications, processor resources are insufficient to execute said command, at least one field of the request message comprises invalid data, at least one value from the request message is out of range, any data transferred is insufficient to execute said command, hardware interface of the message passing medium is incompatible with a target device, communications protocol utilized by the message passing medium is incompatible with a target device, an unrecoverable bus parity error has occurred, a task management function has failed, a host processor aborts the request message, and a target device node has logged-off.

17. The method of claim 12 wherein said predefined condition is met, and said step of generating said reply descriptor further comprises writing said content field to a reply-post buffer, said content field to further comprise a receiving port identifier and a request-initiator identifier; and further comprising the step of transmitting a system interrupt for a host-based driver to read said reply descriptor.

18. The method of claim 17 further comprising the steps of: reading said reply descriptor; correlating a request message identifier of said reply descriptor with the request message; and notifying an originating-caller to confirm completion of the request message.

19. The method of claim 17 wherein said step of generating said reply descriptor is performed with an I/O controller (IOC); and said step of transmitting a system interrupt is performed with said IOC; and further comprising a reply queue register located in an IOC memory, said register to comprise said reply-post buffer and a reply free buffer on which a plurality of addresses, each of which identifies a location of a corresponding reply frame buffer, reside.

20. The method of claim 12 wherein said at least one predefined condition is not met, and said step of generating said reply descriptor further comprises writing said content field to a reply-post buffer, said content field to further comprise said information including an address to an available reply frame buffer located in a host memory, said address having been taken from a reply-free on which a plurality of addresses also reside; and further comprising the step of: generating said reply message with said IOC and copying said reply message into said available reply frame buffer.

21. A computer executable program code on a computer readable storage medium, the program code comprising:

a first program sub-code for generating a reply message to a corresponding I/O request message only if at least one predefined condition is not met; and said first program sub-code comprising instructions for generating a reply descriptor having at least one indication field and a content field that comprises information of said reply message's storage location if said reply message is so generated, but said content field to comprise data copied from said I/O request message if each said predefined condition is met.

22. The program code of claim 21 wherein said instructions for generating said reply descriptor further comprise instructions for writing said content field to a reply-post buffer, and further comprising:

a second sub-code for transmitting a system interrupt over an I/O message passing medium for a host-based driver to read said reply descriptor;

a third sub-code for reading said reply descriptor; and a fourth sub-code for correlating said reply descriptor with said corresponding I/O request message and notifying an originating-caller of a completion results.

23. The program code of claim 22 wherein each said predefined condition is met and said content field comprises data copied from said I/O request message including an identifier selected from the group consisting of: an address to a storage space in a memory, an index value to a table, an index value to a list, an index value to a register, an index value to a stack, an index value to an array, and content-data associated with a hardware assisted CAM; said third sub-code comprises instructions for reading into a host-based memory; and said fourth program sub-code comprises instructions for correlating said request message identifier of said reply descriptor with the I/O request message.

24. The program code of claim 22 wherein said at least one predefined condition is not met because execution of at least one command included in said I/O request message was not completed and said content field comprises said information, said information to comprise an address to an available reply frame buffer located in a host memory; and said address is one from a plurality of addresses, each of which identifies a location of a corresponding reply frame buffer residing in said host memory.

25. The program code of claim 24 wherein said third sub-code comprises instructions for reading said reply descriptor from a reply-post buffer.

* * * * *